United States Patent
Kitahara et al.

(10) Patent No.: US 8,422,050 B2
(45) Date of Patent: Apr. 16, 2013

(54) IMAGE FORMING APPARATUS WITH A PLURALITY OF MODULES RECEIVING A COMMON TRIGGER SIGNAL

(75) Inventors: Toshihiko Kitahara, Tokyo (JP); Junichi Into, Tokyo (JP); Eiichi Motoyama, Tokyo (JP); Masao Watanabe, Toride (JP); Tsunao Hombo, Tokyo (JP); Akihiko Sakai, Abiko (JP); Masatoshi Yaginuma, Toride (JP)

(73) Assignee: Canon Kabushiki Kaisha (JP)

( * ) Notice: Subject to any disclaimer, the term of this patent is extended or adjusted under 35 U.S.C. 154(b) by 1263 days.

(21) Appl. No.: 11/377,622

(22) Filed: Mar. 16, 2006

(65) Prior Publication Data

US 2007/0086037 A1    Apr. 19, 2007

(30) Foreign Application Priority Data

Mar. 18, 2005   (JP) .................... 2005-080494

(51) Int. Cl.
  *G06F 3/12* (2006.01)
(52) U.S. Cl.
  USPC .................... 358/1.15; 358/1.16
(58) Field of Classification Search ........... 358/1.1–1.16
  See application file for complete search history.

(56) References Cited

U.S. PATENT DOCUMENTS

| | | | |
|---|---|---|---|
| 3,913,070 A | 10/1975 | Malcolm et al. | |
| 4,179,732 A | 12/1979 | Khan et al. | |
| 4,811,051 A | 3/1989 | Masuda et al. | |
| 4,941,038 A | 7/1990 | Walowit | |
| 4,952,988 A | 8/1990 | Furuichi et al. | |
| 4,980,780 A | 12/1990 | Tanaka | |
| 5,028,953 A | 7/1991 | Katoh et al. | |
| 5,130,805 A | 7/1992 | Rikima | |
| 5,138,376 A | 8/1992 | Maruta et al. | |
| 5,164,770 A | 11/1992 | Furuichi et al. | |
| 5,481,335 A | 1/1996 | Furuichi et al. | |
| 5,561,500 A | 10/1996 | Ohzeki et al. | |
| 5,596,416 A * | 1/1997 | Barry et al. ................ | 358/296 |
| 5,720,014 A | 2/1998 | Ikeda et al. | |
| 5,732,162 A | 3/1998 | Curry | |
| 5,760,928 A | 6/1998 | Motoyama et al. | |
| 5,819,034 A | 10/1998 | Joseph et al. | |
| 5,860,038 A | 1/1999 | Kato et al. | |

(Continued)

FOREIGN PATENT DOCUMENTS

| | | |
|---|---|---|
| JP | 05-318819 A | 12/1993 |
| JP | 5-318819 A | 12/1993 |
| JP | 6-245021 A | 9/1994 |
| JP | 9-016035 A | 1/1997 |

*Primary Examiner* — Benny Q Tieu
*Assistant Examiner* — Michael Y Tzeng
(74) *Attorney, Agent, or Firm* — Rossi, Kimms & McDowell LLP (57) ABSTRACT

An apparatus is provided that can perform distributed control for a plurality of operation units, without concentrating control in a single device. The apparatus includes a plurality of modules that respectively correspond to a plurality of operation units, each module including a communication device, a functional block setting device and a functional block connected with a corresponding operation unit. The functional block has a register that holds, in an updateable condition, control values relating to various controls of the corresponding operation unit. Each module is triggered by an operation start signal input to a start terminal of the communication device to start an operation for controlling a corresponding operation unit in accordance with each control value held in the register device.

8 Claims, 6 Drawing Sheets

U.S. PATENT DOCUMENTS

| | | | |
|---|---|---|---|
| 5,914,538 A * | 6/1999 | Kurosawa et al. | 307/18 |
| 6,028,675 A | 2/2000 | Fields et al. | |
| 6,226,095 B1 | 5/2001 | Fukuta | |
| 6,249,658 B1 | 6/2001 | Inui et al. | |
| 6,307,615 B1 | 10/2001 | Ito | |
| 6,535,865 B1 | 3/2003 | Skaaning et al. | |
| 6,614,545 B1 | 9/2003 | Langer et al. | |
| 6,679,637 B2 | 1/2004 | Tsuruta et al. | |
| 6,763,336 B1 | 7/2004 | Kolls | |
| 7,034,954 B1 | 4/2006 | Utsunomiya | |
| 7,174,264 B2 | 2/2007 | Yasukawa et al. | |
| 7,260,336 B2 | 8/2007 | Shimura et al. | |
| 7,269,757 B2 | 9/2007 | Lieblich et al. | |
| 7,275,009 B2 | 9/2007 | Yasukawa et al. | |
| 7,324,909 B2 | 1/2008 | Yasukawa et al. | |
| 7,327,488 B2 | 2/2008 | Kawaura | |
| 7,411,694 B2 | 8/2008 | Nomizu | |
| 7,436,550 B2 | 10/2008 | Aoki et al. | |
| 7,463,550 B2 | 12/2008 | Sinha et al. | |
| 7,480,083 B2 | 1/2009 | Takahashi et al. | |
| 2002/0149640 A1 * | 10/2002 | Gomez et al. | 347/19 |
| 2003/0018829 A1 * | 1/2003 | Carney et al. | 709/321 |
| 2004/0139385 A1 * | 7/2004 | Sakaue | 715/500 |
| 2004/0252324 A1 | 12/2004 | Ohta | |
| 2005/0088700 A1 | 4/2005 | Aoki et al. | |
| 2005/0141030 A1 | 6/2005 | Tuchitoi et al. | |
| 2005/0174597 A1 | 8/2005 | Ikeda | |
| 2005/0182977 A1 * | 8/2005 | Powers et al. | 713/300 |
| 2005/0262394 A1 | 11/2005 | Yasukawa et al. | |
| 2005/0281596 A1 | 12/2005 | Nakagawa et al. | |
| 2005/0289559 A1 | 12/2005 | Illowsky et al. | |
| 2006/0020912 A1 | 1/2006 | Illowsky et al. | |
| 2006/0206882 A1 | 9/2006 | Illowsky et al. | |
| 2006/0209341 A1 | 9/2006 | Motoyama | |
| 2006/0209352 A1 | 9/2006 | Motoyama | |
| 2006/0215215 A1 | 9/2006 | Kumaran | |
| 2007/0086037 A1 | 4/2007 | Kitahara et al. | |
| 2010/0211190 A1 * | 8/2010 | Akita | 700/3 |

* cited by examiner

IMAGE FORMING APPARATUS WITH A PLURALITY OF MODULES RECEIVING A COMMON TRIGGER SIGNAL

BACKGROUND OF THE INVENTION

1. Field of the Invention

The present invention relates to an apparatus comprising a plurality of operation units and an image forming apparatus.

2. Related Background Art

A conventional image forming apparatus consists of a plurality of units including an image forming process unit, a sheet feeding unit, a sheet conveying unit and a fixing unit, and each unit is controlled by a single control device referred to as a DC controller. As an example of an image forming apparatus having a DC controller, the invention disclosed in Japanese Patent Application Laid-Open No. H05-318819 may be mentioned.

More specifically, the DC controller carries out control relating to operations including starting and stopping the operations of each unit in accordance with the image formation sequence. The DC controller also monitors the operating state of each unit, and when an error occurs in any of the units, the DC control performs processing and the like to respond to the error.

However, in the conventional image forming apparatus, since control for all of the units is concentrated in the DC controller, the DC controller bears a heavy load in terms of hardware and software. For this reason, as image forming apparatuses became larger or are given higher levels of functionality, the load placed on the DC controller increases more and more.

SUMMARY OF THE INVENTION

An object of the present invention is to provide an image forming apparatus and an apparatus that can perform distributed, control for a plurality of operation units to realize control that is not concentrated in a single device.

In order to attain the above object, the apparatus according to the present invention has the following configuration:

An apparatus comprising a plurality of operation units, and a plurality of modules that correspond respectively to the plurality of operation units, the plurality of modules having:

a control value holding device that holds a control value for controlling a corresponding operation unit;

a control device that autonomously controls a corresponding operation unit in accordance with a control value that is held by the control value holding device; and a communication device that receives, at least, a common trigger signal that is sent simultaneously to the plurality of modules;

wherein the control device, upon receiving the trigger signal from the communication device, shifts to a state in which control of a corresponding operation unit is enabled.

Further, the image forming apparatus according to this invention has the following configuration:

An image forming apparatus comprising a plurality of operation units, which forms an image on a sheet by the respective operations of the operation units, further comprising a plurality of modules that correspond respectively to the plurality of operation units, the plurality of modules having:

a control value holding device that holds a control value for controlling a corresponding operation unit;

a control device that autonomously controls a corresponding operation unit in accordance with a control value that is held in the control value holding device; and a communication device that receives, at least, a common trigger signal that is sent simultaneously to the plurality of modules;

wherein the control device, upon receiving the trigger signal from the communication device, shifts to a state in which control of a corresponding operation unit is enabled.

The other objects and features of this invention will be apparent from the following description and the attached drawings.

DESCRIPTION OF THE PREFERRED EMBODIMENTS

Hereunder, the embodiments of this invention are described referring to the attached drawings.

First Embodiment

Figure 1:
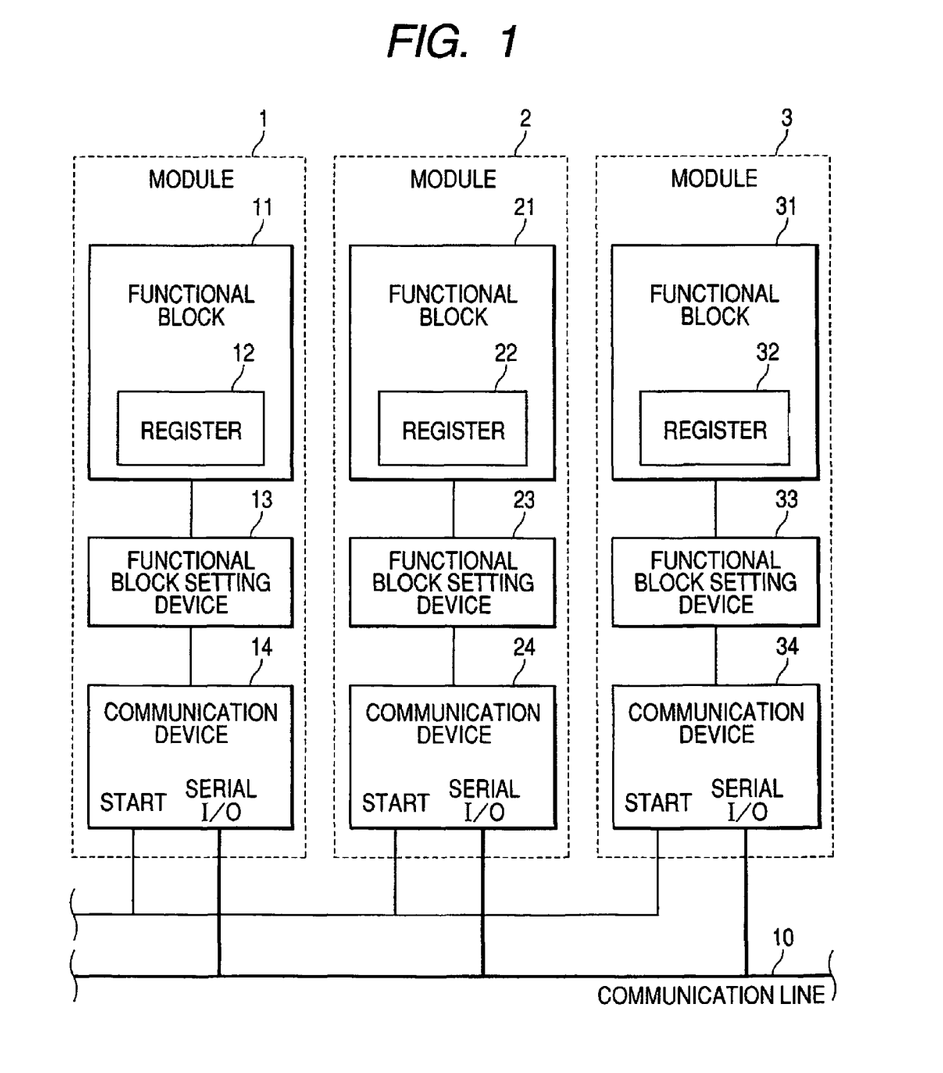
FIG. 1 is a block diagram illustrating the configuration of an apparatus according to the first embodiment of this invention.

FIG. 1 is a block diagram illustrating the configuration of the apparatus according to the first embodiment of this invention.

An apparatus that includes a plurality of operation units and implements a predetermined function by operating each operation unit, comprises, as shown in FIG. 1, a plurality of modules 1, 2, and 3 that can communicate through a common communication line 10, wherein the modules 1, 2, and 3 autonomously control corresponding operation units (not shown), respectively. An operation unit is composed of at least one member of the group consisting of a driving member (including a drive motor), a drive circuit and a sensor, or a combination of these, and performs the corresponding operation required to implement a function of the apparatus. Unique identification information is allocated to the modules 1, 2, and 3, and the modules 1, 2, and 3 are identified by their respective identification information.

Module 1 comprises a functional block 11, a functional block setting device 13 and a communication device 14 that are connected to the corresponding operation unit. The functional block 11 has a register 12 that holds, in an updatable condition, control values relating to various controls of the corresponding operation unit, and a sensor (not shown) that detects the operating state of the corresponding operation unit. The functional block 11 carries out operations for controlling the corresponding operation unit based on the control values held in the register 12 and the detected operating state of the operation unit and/or the operating state of an operation unit that is controlled by another module. As necessary, in addition to the above control values, the register 12 may hold data showing the detected operating state or the like of the operation unit.

The functional block setting device 13 has an interface function that mediates data sending and, receiving between the functional block 11 and the communication device 14, and writes, to the register 12, data corresponding to information received through the communication device 14, or reads out data of the register 12. For example, in response to information (operating mode of apparatus or operating state of an operation unit controlled by another module) received from the communication device 14, the functional block setting device 13 writes the corresponding control value to the register 12 at an arbitrary timing. Further, in response to a request from another module, the functional block setting device 13 notifies the operating state of the operation unit held in the register 12 to the other module through the communication device 14.

The communication device 14 has a serial I/O terminal (Serial I/O) that is connected to the communication line 10, and a start terminal for inputting an operation start signal from outside. The communication device 14 sends data to the communication line 10 or receives data from the communication line through the serial I/O terminal. When an operation start signal is input to the start terminal, the functional block setting device 13 is triggered by the operation start signal to write the corresponding control value to the register 12 so as to start operations in the functional block 11.

Similarly to module 1, modules 2 and 3 comprise functional blocks 21 and 31 having respective registers 22 and 32, functional block setting devices 23 and 33, and communication devices 24 and 34. The configuration of these devices is the same as the devices of module 1, and a description of the devices is thus omitted herein.

When the modules 1, 2 and 3 that are configured in this manner are triggered by an operation start signal that is input to the communication devices 14, 24 and 34, they start operations for controlling the corresponding operation units, respectively. More specifically, in response to the input of an operation start signal, the functional blocks 11, 21 and 31 start a sequence for controlling the corresponding operation unit, respectively, and output a control signal to the corresponding operation unit based on the respective control values held in the registers 12, 22 and 32 and the detected operating state of the operation unit. The functional blocks 11, 21 and 31 also monitor the operating states of the corresponding operation units and, as necessary, write data indicating the operating state of the corresponding operation unit in the registers 12, 22 and 32. In this example, detection of the operating states of the corresponding operation units is performed, for example, based on the output of sensors provided in the corresponding operation units.

The modules 1, 2 and 3 communicate with each other through the communication line 10 using the communication devices 14, 24 and 34, to send the operation state of the operation unit that the module in question controls to the other modules, and to obtain the operating state of the respective corresponding operation units from the other modules. Each of the modules 1, 2 and 3 can thus execute a sequence for controlling the corresponding operation unit while interacting with each other.

Although this embodiment described a case in which an operation start signal is generated from an external apparatus and input to each of the modules 1, 2 and 3, a configuration may also be adopted whereby, upon a predetermined condition being realized when a specific module among the modules 1, 2 and 3 operated according to an internal sequence, the module in question generates an operation start signal and inputs the operation start signal to the other modules.

Further, although this embodiment described a case in which a dedicated start terminal is provided in the communication devices 14, 24 and 34 of the modules 1, 2 and 3, a configuration may instead be adopted whereby, for example, identification information is attached to an operation start signal input from outside, and the operation start signal attached with the identification information is input through the communication line 10.

Furthermore, although this embodiment described a case in which operation of each of the modules 1, 2 and 3 is started by a common operation start signal, it is possible to stop the operation of each of the modules 1, 2 and 3 by inputting a common operation stop signal to the modules 1, 2 and 3. At that time, the operation stop signal may be input to a dedicated input terminal or an operation stop signal attached with unique identification information may be input through the communication line 10.

As described in the foregoing, according to this embodiment, by adopting a configuration in which a plurality of operation units are controlled by their respective corresponding modules instead of a configuration in which a plurality of operation units are controlled in a centralized manner by a single device, distributed control can be performed without concentrating control in a single device.

Figure 2:
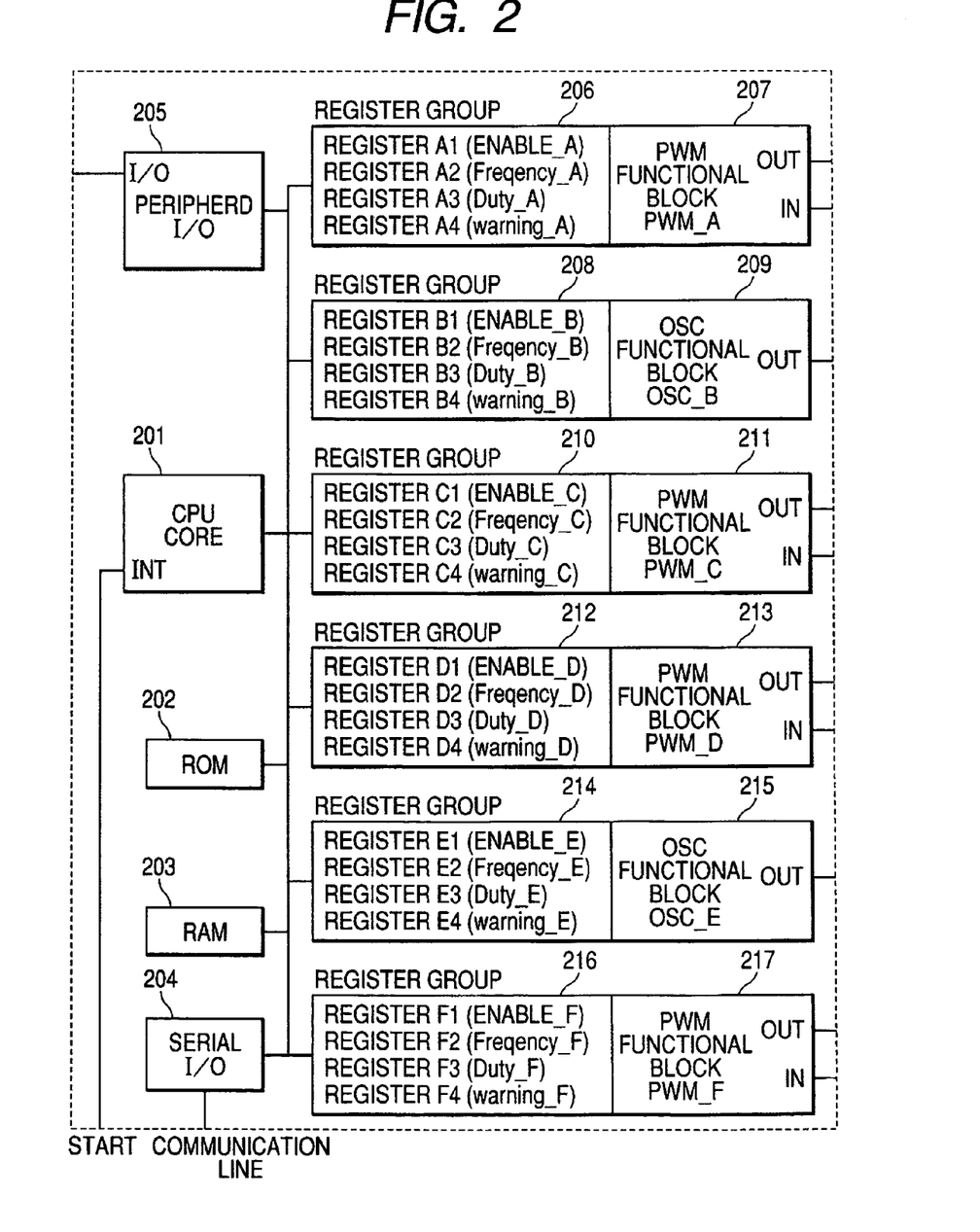
FIG. 2 is a block diagram illustrating the configuration of the principal portions of a laser module for a laser scanner unit of a printer portion of the image forming apparatus.

The above-described module configuration can, for example, by applied to a printer portion of an image forming apparatus. Hereunder, a description is given of a configuration example of a laser module for a laser scanner unit as one operation unit among a plurality of operation units comprising a printer portion. A laser scanner unit is a device that exposes a photosensitive drum by scanning the surface of the photosensitive drum with a laser beam to form an electrostatic latent image on the photosensitive drum. FIG. 2 is a block diagram illustrating the configuration of the principal portions of a laser module for a laser scanner unit of a printer portion of an image forming apparatus.

The laser scanner unit has a laser-emitting portion that modulates a laser beam in accordance with a driving signal based on an image signal (video signal) and outputs the Laser beam, and an exposure-scanning portion that irradiates a laser beam output from the laser-emitting portion onto the photosensitive drum using a polygonal mirror while scanning the laser beam in the main scanning direction.

As shown in FIG. 2, the laser module for controlling this laser scanner unit comprises a CPU core 201, a ROM 202, a RAM 203, a serial I/O interface 204, a peripheral I/O interface 205 and a plurality of functional blocks 207, 209, 211, 213, 215 and 217. Corresponding register groups 206, 208, 210, 212, 214 and 216 are built into each of the functional blocks 207, 209, 211, 213, 215 and 217, respectively. The CPU core 201, ROM 202, RAM 203, serial I/O interface 204, peripheral I/O interface 205 and each of the register groups 206, 208, 210, 212, 214 and 216 are connected to each other through an internal bus.

In accordance with a program stored in the ROM 202, the CPU core 201 performs operations to set a control value for controlling operations such as start and stop operations of each of the functional blocks 207, 209, 211, 213, 215 and 217 in the corresponding register groups 206, 208, 210, 212, 214 and 216. The work area of the CPU 201 is provided by a RAM 203. The CPU core 201 has an INT terminal (interrupt terminal), and this INT terminal is used as a start terminal for input of an operation start signal. This operation start signal is, for example, a send signal for image data.

The peripheral I/O interface 205 is an interface for inputting an image signal (video signal).

The serial I/O interface 204 is an interface for performing communication with another module through a common communication line, and it has a serial I/O terminal that is connected with a common communication line 10.

The register group 206 consists of a plurality of registers A1 to A4 in which control values for controlling the operations of a PWM functional block ($PWM_{13}A$) 207 are respectively written. The PWM functional block 207 performs operations for generating a driving signal of the scanner unit (laser-emitting portion) based oh the aforementioned image signal in accordance with the control values of the registers A1 to A4 of the register group 206.

The register group 208 consists of a plurality of registers B1 to B4 in which control values for controlling the operations of an OSC functional block (OSC_B) 209 are respectively written. The OSC functional block 209 performs operations that generate a clock signal having a corresponding frequency in accordance with the control values of the registers B1 to B4 of the register group 208.

The register group 210 consists of a plurality of registers C1 to C4 in which control values for a PWM functional block 211 (PWM_C) are respectively written. The PWM functional block 211 performs operations for generating a driving signal of the scanner unit (laser-emitting portion) in accordance with the control values of the registers C1 to C4 of the register group 210.

The register group 212 consists of a plurality of registers D1 to D4 in which control values for a PWM functional block 213 (PWM_D) are respectively written. The PWM functional block 213 performs operations for generating a driving signal of the scanner unit (laser-emitting portion) in accordance with the control values of the registers D1 to D4 of the register group 212.

The register group 214 consists of a plurality of registers E1 to E4 in which control values for an OSC functional block (OSC_E) 215 are respectively written. The OSC functional block 215 performs operations that generate a clock signal having a corresponding frequency in accordance with the control values of the registers E1 to E4 of the register group 214.

The register group 216 consists of a plurality of registers F1 to F4 in which control values for a PWM functional block (PWM_F) 217 are respectively written. The PWM functional block 217 performs operations for generating a driving signal of the scanner unit (laser-emitting portion) in accordance with the control values of the registers F1 to F4 of the register group 216.

Figure 3:
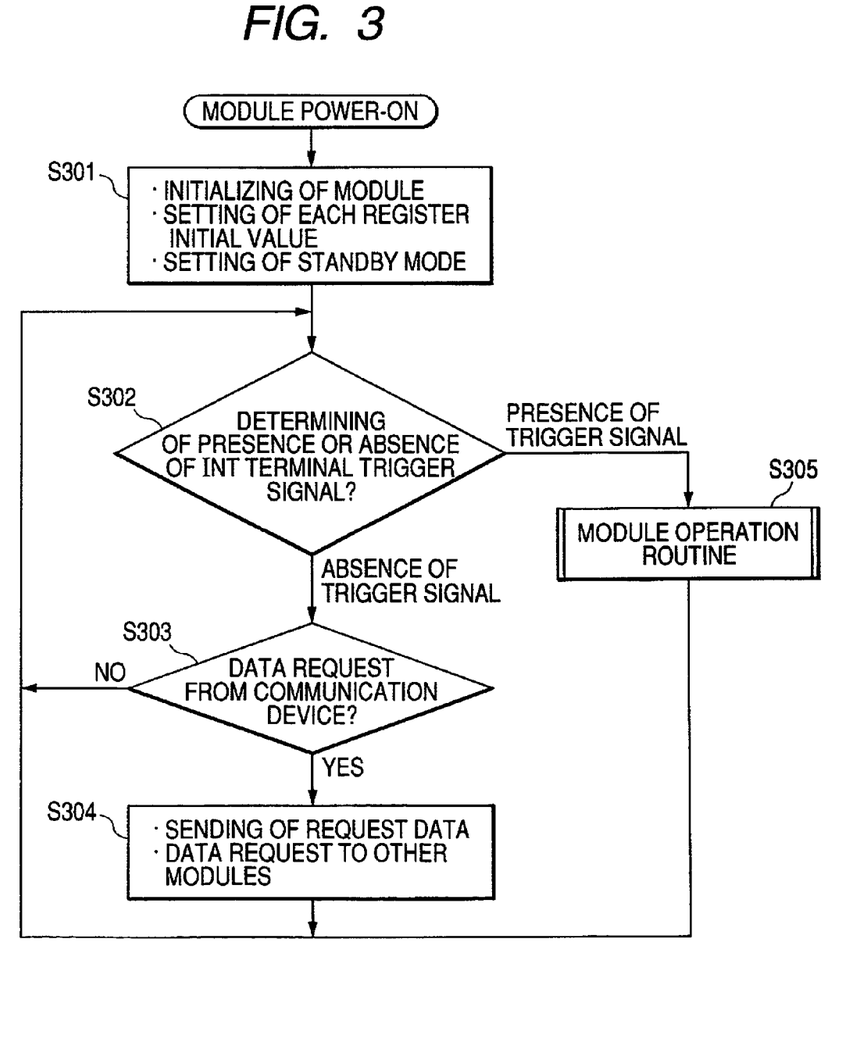
FIG. 3 is a flowchart illustrating the operating procedures at power-ON of the laser module of FIG. 2.
Figure 4:
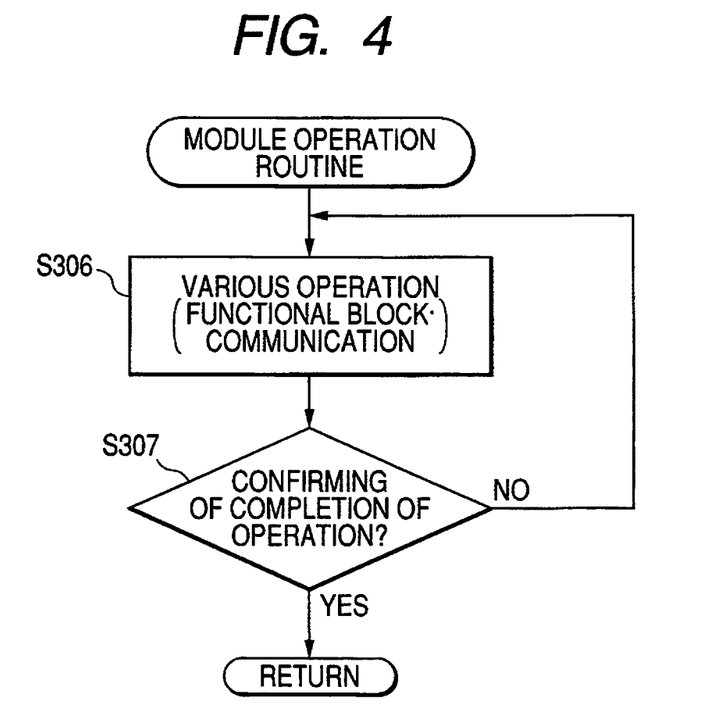
FIG. 4 is a flowchart-illustrating the procedures of a module operation routine of step S306 of FIG. 3.

Next, the operations of the above laser module are described with reference to FIG. 3 and FIG. 4. FIG. 3 is a flowchart illustrating the operating procedures at power-ON of the laser module of FIG. 2, and FIG. 4 is a flowchart illustrating the procedures of a module operation routine of step S306 in FIG. 3. In this example, the procedures illustrated in the flowcharts of FIG. 3 and FIG. 4 are those executed by the CPU core 201 in accordance with a program stored in the ROM 202.

As shown in FIG. 3, when the power of the module is turned on, the CPU core 201 is activated to perform initialization of the module (step S301). At this time, after initializing the module and setting the corresponding initial value for each register of the register groups 206, 208, 210, 212, 214 and 216, the CPU core 201 shifts to a standby state in which it awaits input of a signal to the INT terminal. In this standby state, since a value "0" corresponding to stop is set as the initial value in the registers A1, B1, C1, D1, E1, and F1 (ENABLE_A-D) of the respective register groups 206, 208, 210, 212, 214 and 216, the PWM functional blocks 207, 211, 213 and 217 and the OSC functional blocks 209 and 215 are in an operation stop state.

Next, the CPU core 201 determines whether or not an operation start signal was input to the INT terminal as a trigger signal (step S302). If an operation start signal was input to the INT terminal as a trigger signal, the CPU core 201 shifts to a module operation routine for starting the operation of each of the functional blocks 207, 209, 211, 213, 215 and 217 (step S306)

As shown in FIG. 4, in this module operation routine the CPU core 201 updates the control values of the register groups 206, 208, 210, 212, 214 and 216 to start the operations of each of the functional blocks 207, 209, 211, 213, 215 and 217 (step S306). At this time, "1" is set as a value indicating that operation is enabled in the registers A1, B1, C1, D1, E1, and F1 (ENABLE_A-D) of each of the register groups 206, 208, 210, 212, 214 and 216. As a result, each of the functional blocks 207, 209, 211, 213, 215 and 217 starts operating in accordance with the control values set in their respective register groups 206, 208, 210, 212, 214 and 216. That is, the operations of this module are started. These operations also include operations by the serial I/O interface 204 in response to a data request from another module or a data request to another module. These operations by the serial I/O interface 204 are operations corresponding to steps S303 and S304 to be described later. The CPU core 201 then monitors the operating states of the functional blocks 207, 209, 211, 213, 215 and 217 and the serial I/O interface 204, and waits for completion of the operations of the functional blocks 207, 209, 211, 213, 215 and 217 and the serial I/O interface 204 (step S307). When the operations of each of the functional blocks 207, 209, 211, 213, 215 and 217 are completed, the CPU core 201 leaves the module operation routine to return to the above step S302.

In the above step S302, when the CPU core 201 determined that an operation start signal as a trigger signal was not input to the INT terminal, the CPU core 201 determines the presence or absence of a data request from another module or a data request to another module (step S303). As used herein, the term "data request from another module" refers to another module requesting transmission of data such as an operating state through the serial I/O interface 204, and the term "data request to another module" refers to the present module requesting another module to transmit data such as the operating state of the other module through the serial I/O interface 204.

When the CPU core 201 determined in the above step S303 that there is no data request from another module or data request to another module, it returns to the above step S302. In contrast, when it determined in the above step S303 that there is a data request from another module, the CPU core 201 acquires the data corresponding to the data request from the other module and passes the acquired data to the serial I/O interface 204 (step S304). The serial I/O interface 204 then sends the passed data to the other module. Further, when the CPU core 201 determined in the above step S303 that there is a data request to another module, it instructs the serial I/O interface 204 to send the data request to the other module, and brings in the data that was returned from the other module in response to the aforementioned data request through the serial I/O interface 204 (step S304). The CPU core 201 then returns to the aforementioned step S302.

Although the present embodiment described a configuration example of a module that used the CPU core 201, a configuration can also be employed that utilizes microprogram technology to execute the operations of each functional block by serially reading out a ROM code to allocate sequential control values, (signals) to each functional block without utilizing a CPU core. In the case of a configuration utilizing this microprogram technology, by using a rewritable nonvolatile memory as the ROM, it is also possible, in a predetermined state, to rewrite the control values of the ROM and change the control values of registers of the register groups to the rewritten control values.

Second Embodiment

Figure 5:
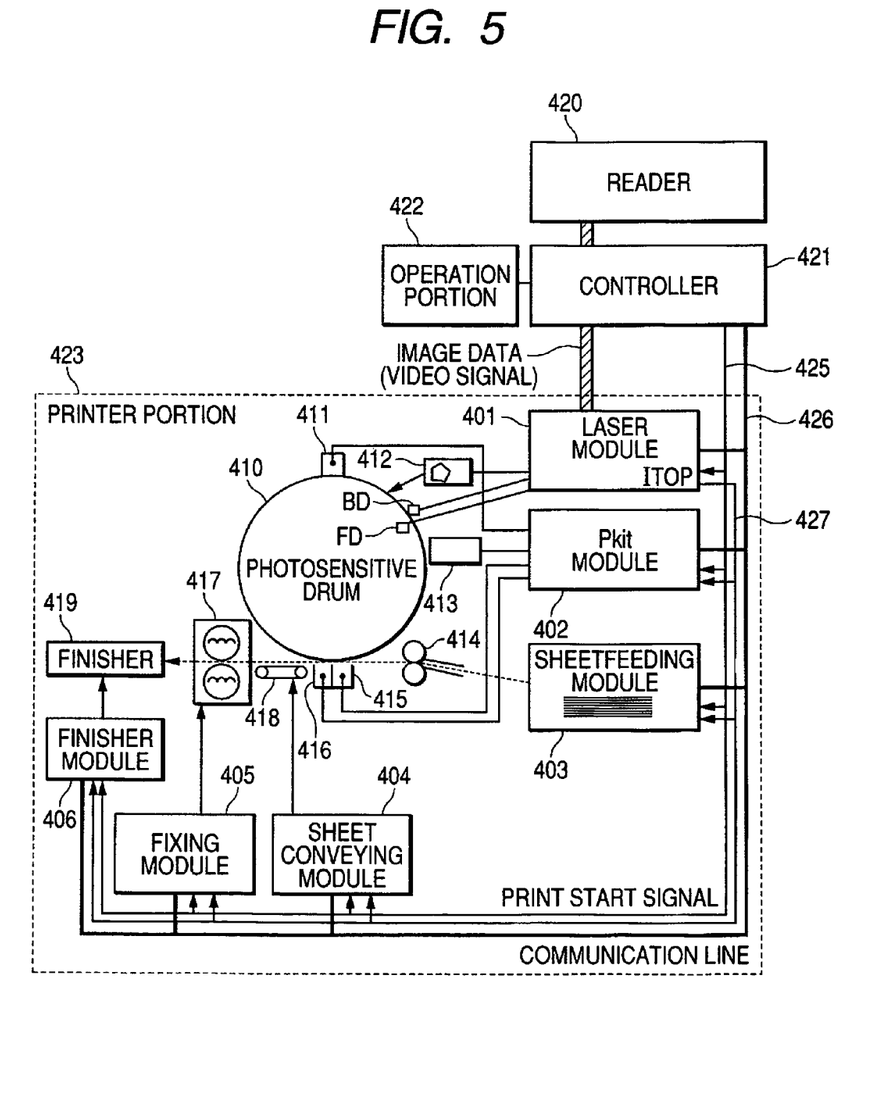
FIG. 5 is a view that schematically illustrates the configuration of an image forming apparatus according to the second embodiment of this invention.
Figure 6:
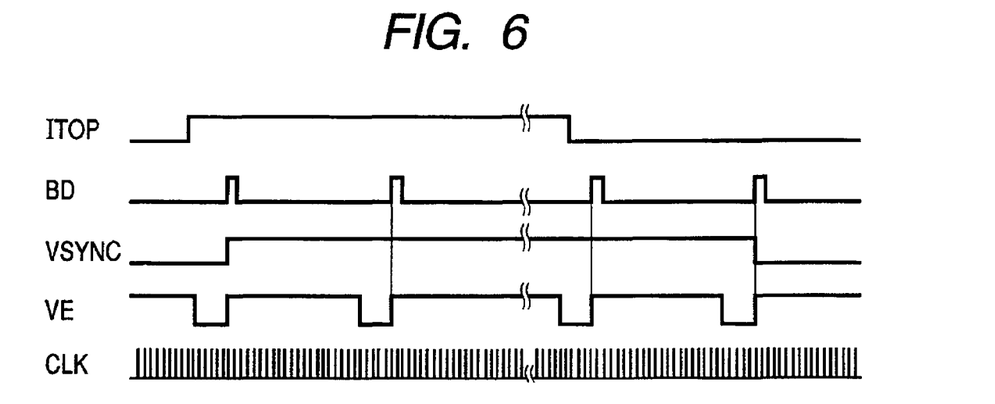
FIG. 6 is a timing chart of each control signal used within the laser module of the image forming apparatus of FIG. 5.

Next, the second embodiment of this invention will be described referring to FIG. 5 and FIG. 6. FIG. 5 is a view that schematically illustrates the configuration of an image forming apparatus according to the second embodiment of this invention, and FIG. 6 is a timing chart of each control signal used within a laser module of the image forming apparatus of FIG. 5.

As shown in FIG. 5, the image forming apparatus comprises a reader portion 420, a controller 421, an operation portion 422, and a printer portion 423. The reader portion 420 scans an image on an original and outputs the resulting image data. The controller 421 performs predetermined image processing for the image data from the reader portion 420, and stores the image data after image processing in an image memory (not shown). The operation portion 422 enables input operations to perform settings to set the operating mode and the number of copies and the like, and also has a display panel for displaying the setting contents, the apparatus state and the like.

The printer portion 423 has a photosensitive drum 410, a primary charging device 411 for uniformly charging the surface of the photosensitive drum 410 to a predetermined potential; a laser scanner 412 for exposing the surface of the photosensitive drum 410 by scanning with a laser beam; a beam detector BD and a photodetector FD that are disposed in the vicinity of the photosensitive drum 410; a developing device 413 for visualizing as a toner image an electrostatic latent image that was formed on the photosensitive drum 410 by the aforementioned exposure scanning of the laser beam; a transfer charging device 415 for transferring a toner image on the photosensitive drum 410 onto a sheet fed from a sheet feeding cassette 424; and a separation charging device 416 for separating a sheet from the photosensitive drum 410.

A sheet onto which the above toner image was transferred is conveyed to a fixing device 417 via a sheet conveying-belt 418. The fixing device 417 heats and presses the toner image on the sheet to fix the toner image onto the sheet. After passing through the fixing device 417, the sheet is conveyed to a finisher 419. The finisher 419 performs sheet processing such as sorting and stapling sheets.

The sheet-feeding cassette 424 is loaded with a plurality of sheets of a predetermined size, and the loaded sheets are fed, one at a time, to a registration roller 414 by a sheet feeding roller (not shown). After being temporarily stopped by the registration roller 414, the fed sheets are sent between the photosensitive drum 410 and the transfer charging device 415 in accordance with the image formation timing.

The beam detector BD detects a laser beam immediately prior to the start of scanning of one line with respect to the photosensitive drum 410, and outputs a BD signal to the laser module 401 (to be described later) as a synchronizing signal for one line. The photodetector FD detects a laser beam indicating the leading position of one image frame with respect to the photosensitive drum 410, and outputs an ITOP signal (vertical synchronizing signal) that is a signal indicating the leading edge of the sheet to the laser module 401 (to be described later) as a synchronizing signal for the image sending direction (subscanning direction).

The laser scanner 412 is driven and controlled by a laser module 401. The laser module 401 reads image data from the above image memory in synchrony with the output timing of a BD signal of the beam detector BD, and generates a driving signal for driving the laser scanner 412 based on the image data that was read.

Driving control of the photosensitive drum 410 and high voltage power supply control of the primary charging device 411, the developing device 413, the transfer charging device 415 and the separation charging device 416 are performed by a process kit (Pkit) module 402.

An operation to feed a sheet from the sheet feeding cassette 424 and driving of the registration roller 414 are controlled by a sheet feeding module 403. Driving of the sheet conveying belt 418 is controlled by a sheet conveying module 404.

The operations of the fixing device 417 are controlled by a fixing module 405. More specifically, the fixing module 405 performs driving control for a pair of fixing rollers (not shown) of the fixing device 417 and temperature adjustment control for a heater (not shown) of the fixing device 417.

The finisher 419 is controlled by a finisher module 406. More specifically, the finisher module 406 performs control for executing a sort mode that sorts and loads sheets into a plurality of bins provided in the finisher 419 and a staple mode that binds batches of sheets using a stapler of the finisher 419.

The laser module 401, process kit module 402, sheet feeding module 403, sheet conveying module 404, fixing module 405 and finisher module 406 each have a configuration that is equivalent to the module described in the first embodiment. More specifically, they each have a configuration that corresponds to a functional block provided with a register, a functional block setting device and a communication device. In this example, a detailed description of the internal constituents of the modules 401 to 406 is omitted.

Each of the modules 401 to 406 is connected to the controller 421 through a print start signal line 425 and a communication line 426. In this example, the print start signal line 425 is connected to a start terminal of the communication device of each of the modules 401 to 406, and a print start signal sent from the controller 421 is input to each of the modules 401 to 406 through the print start signal line 425.

The communication line 426 is connected to a serial I/O terminal of the communication device of each of the modules 401 to 406, and information is exchanged between the modules 401 to 406 or between the controller 421 and the modules 401 to 406 through the communication line 426. For example, an operating mode that was set by a user through the operation portion 422 is notified to each of the modules 401 to 406 from the controller 421 through the communication line 426. Further, when an error is generated at one of the modules 401 to 406, an error signal indicating the error contents is notified to the other modules 401 to 406 and the controller 421. The controller 421 displays the contents of the generated error on the display panel of the operation portion 422 based on the notified error signal.

The laser module 401 sends an ITOP signal as an operation synchronizing signal to the other modules 402 to 406 through the communication line 427.

Next, the operation of this image forming apparatus will be described.

It is assumed that the power of the image forming apparatus has already been turned on, and each of the modules 401 to 406 of the printer portion 423 is in a standby mode state as described in the first embodiment. When performing copying, first an original is placed on the reader portion 420 by the user, and setting of the operating mode (one-sided copy, two-sided copy, enlargement/reduction, sort processing, staple processing, number of copies, et cetera) is performed through the operation portion 422. Thereafter, the copy operation is started when the user presses a start key on the operation portion 420. At this time, the operating mode that was set is notified from the controller 421 to each of the modules 401 to 406 of the printer portion 423 through the communication line 426.

Accompanying the start of the copy operation, scanning of the placed original is performed by the reader portion 420 and the resulting image data is output to the controller 421. After performing predetermined image processing on the image data, the controller 421 stores this image data (video signal) in the image memory in page units. Simultaneously thereto, the controller 421 sends a print start signal to each module 401 to 406 of the printer portion 423 through the print start signal line 425. When the print start signal is input to the modules 401 to 406, each module takes the signal as a trigger signal and shifts from standby mode to operating mode to start operation. At this time, when each of the modules 401 to 406 enters a state in which operation is enabled in accordance with the operating mode that was notified from the controller 421, the module in question sets a value indicating an operation enabled state in the corresponding register.

More specifically, when the laser module 401 receives the print start signal it controls the laser scanner 412 so as to perform rotational driving and the like of a polygonal mirror for scanning a laser beam in the axial direction of the photosensitive drum 410. When the laser module 401 enters an operation enabled state, i.e. a state in which it can control the laser scanner 412, the laser module 401 rewrites the value of the corresponding internal register to a value indicating an operation enabled state.

When the process kit (Pkit) module 402 receives the print start signal, it performs rotation control and the like for the photosensitive drum 410 so as to start process preprocessing for image formation at startup. When the process kit (Pkit) module 402 enters an operation enabled state, more specifically, a ready state for rotation control of the photosensitive drum 410 and control of high voltage power supply of the primary charging device 411, the developing device 413, the transfer charging device 415, the separation charging device 416 and the like, the process kit (Pkit) module 402 rewrites the value of the corresponding internal register to a value indicating an operation enabled state.

When the sheet feeding module 403 receives the print start signal it shifts from standby mode to operating mode, and upon entering a state in which control is enabled for feeding sheets from the sheet feeding cassette 424 to the registration roller 414, the sheet feeding module 403 rewrites the value of the corresponding internal register to a value indicating an operation enabled state.

When the sheet conveying module 404 receives the print start signal it shifts from standby mode to operating mode, and upon entering a state in, which control is enabled for conveyance of sheets by the sheet conveying belt 418 and the like, the sheet conveying module 404 rewrites the value of the corresponding internal register to a value indicating an operation enabled state.

When the fixing module 405 receives the print start signal it shifts from standby mode to operating mode, and upon entering a state in which temperature control of the fixing device 417 and drive control of the fixing roller of the fixing device 417 are enabled, the fixing module 405 rewrites the value of the corresponding internal register to a value indicating an operation enabled state.

When the finisher module 406 receives the print start signal it shifts from standby mode to operating mode, and upon entering a state in which control of the drive system (drive system for the conveying roller, bins, stapler and the like) of the finisher 419 is enabled, the finisher module 406 rewrites the value of the corresponding internal register to a value indicating an operation enabled state.

The controller 421 reads out the values of the corresponding registers of each of the modules 401 to 406 through the communication line 426, and determines whether or not each of the modules 401 to 406 is in an operation enabled state based on the values of each register that were read out. If all of the modules 401 to 406 are in an operation enabled state, the controller 421 reads out the image data from the image memory in page units and sends the data to the laser module 401.

Upon receiving the image data, taking a BD (beam detector) signal and an ITOP signal as reference signals the laser module 401 drives the laser scanner 412 in order to form an electrostatic latent image on the photosensitive drum 410. Then, the other modules 402 to 406 respectively execute a sequence for controlling the corresponding units in accordance with the control values held in the registers, taking an ITOP signal output from the laser module 401 as a reference.

In this example, as shown in FIG. 6, a VSYNC signal as an image effective interval signal in the subscanning direction, a VE signal as an image effective interval signal in the main scanning direction, and a CLOCK signal as a pixel synchronizing signal are generated inside the laser module 401. When an ITOP signal set to "1" as a signal indicating the leading edge of a sheet is input to the laser module 401, a VSYNC signal is generated. During an interval in which this VSYNC signal is "1", pixel data is transferred synchronously with the CLOCK signal rising from "0" to "1". The VSYNC signal rises synchronously with a first input BD signal when the ITOP signal is set to "1", and remains "1" until a given number of BD signals are counted to determine the size of the sheet in the main scanning direction and the like. The VE signal rises on the basis of both the ITOP signal and the BD signal. The timing of a main scanning start position is indicated by the VE signal being "1".

Thus, according to the present embodiment, control for each operation unit constituting the printer portion 423 can be performed by distributing the control among the respective corresponding modules, without centralizing the control for each operation unit as in the conventional apparatus.

The invention is not limited to the example of division of the operation units of the printer portion 423 shown here, and another form of division may be adopted.

As described in the foregoing, according to the embodiments of this invention distributed control can be carried out for a plurality of operation units without concentrating the control in a single device.

This application claims priority from Japanese Patent Application No. 2005-080494 filed Mar. 18, 2005, which is hereby incorporated by reference herein.

What is claimed is:

1. An image forming apparatus for forming an image by a plurality of different image forming operations corresponding to the image, the image forming apparatus comprising:
  a plurality of operation units each of which executes an assigned operation from among the plurality of different image forming operations corresponding to the image, and the plurality of operation units forms the image while interacting with each other; and a plurality of modules that corresponds respectively to the plurality of operation units and control the plurality of operation units to execute the image forming operations, the plurality of modules each including:

a control value holding device that holds a control value for controlling a corresponding operation unit;

a control device that autonomously controls a corresponding operation unit in accordance with the control value that is held by the control value holding device; and a communication device that receives, at least, a common trigger signal that is a communication signal and is sent simultaneously to the plurality of modules;

wherein the control device, upon receiving the trigger signal from the communication device, shifts to a state in which control of a corresponding operation unit is enabled; and wherein the plurality of operation units executes the plurality of image forming operations to form the image.

2. The apparatus according to claim 1, wherein the trigger signal is a signal designating start of operation that is sent from outside or from a specific module among the plurality of modules.

3. The apparatus according to claim 1, wherein a specific module among the plurality of modules outputs a reference signal as an operating reference for other modules.

4. The apparatus according to claim 1, wherein each of the plurality of modules has a control value setting device for updating the control value held in the control value holding device.

5. The apparatus according to claim 1, wherein each of the plurality of modules has an operating state holding device that holds an operating state of a corresponding operation unit, and the plurality of modules can refer to the operating state that is held in the operating state holding device of each module through the communication device of each module.

6. The image forming apparatus according to claim 1, wherein the plurality of operation units includes a laser scanner unit, an image forming process unit, a sheet feeding unit, a sheet conveying unit, a fixing unit and a finisher unit.

7. The image forming apparatus according to claim 1, wherein the trigger signal is a signal designating start of image formation.

8. The image forming apparatus according to claim 1, further comprising an operating mode setting device that sets an operating mode relating to image formation, wherein each of the plurality of modules has a control value setting device for setting a control value corresponding to the set operating mode in the control value holding device.

* * * * *